United States Patent [19]

Saito

[11] Patent Number: 4,494,474
[45] Date of Patent: Jan. 22, 1985

[54] FENDER AND LIFE LADDER IN ONE

[75] Inventor: Ryosuke Saito, Kobe, Japan

[73] Assignee: Sumitomo Gomu Kogyo Kabushiki Kaisha, Kobe, Japan

[21] Appl. No.: 436,976

[22] Filed: Oct. 27, 1982

[30] Foreign Application Priority Data

Oct. 27, 1981 [JP] Japan .................. 56-160603

[51] Int. Cl.³ ............................. B63B 59/02
[52] U.S. Cl. .................... 114/219; 114/362; 182/100
[58] Field of Search ............... 114/219, 220, 221 R, 114/362, 343; 405/211–212, 214–215; 182/46, 100, 189

[56] References Cited

U.S. PATENT DOCUMENTS

| 3,000,021 | 9/1961 | Lang | 114/219 |
| 3,869,742 | 3/1975 | Gale et al. | 114/362 |
| 3,937,170 | 2/1976 | Drewett | 114/219 |
| 4,267,792 | 5/1981 | Kimura et al. | 114/219 |
| 4,355,701 | 10/1982 | Nicholson | 182/100 |
| 4,376,419 | 3/1983 | Heilskov | 114/219 |

Primary Examiner—Trygve M. Blix
Assistant Examiner—Jesús D. Sotelo
Attorney, Agent, or Firm—Robert E. Burns; Emmanuel J. Lobato; Bruce L. Adams

[57] ABSTRACT

A fender and life ladder for mounting on the wall surface of a quay in a harbor comprises a main post formed of a resilient material and a plurality of rung members mounted on said main post in a spaced relation. The main post comprises a shock receiving portion provided with a shock receiving surface for making contact with a boat, a rear wall portion positioned substantially parallel to and spaced apart from said shock receiving portion, and a pair of side wall portions. The side wall portions are each connected along both widthwise ends thereof to respective ones of said shock receiving portion and said rear wall portion, and the side wall portions diverge away from each other in the direction from said shock receiving portion towards said rear wall portion. The plurality of rung members extend substantially horizontally and parallel to the wall surface in a suitably spaced relation along the length of said shock receiving portion.

20 Claims, 6 Drawing Figures

FENDER AND LIFE LADDER IN ONE

BACKGROUND OF THE INVENTION

1. Field of the Invention

The present invention relates to ladders useable as lifesaving equipment for operators who fall into water by accident, which ladders are mounted on quays of harbors, coasts, rivers, etc. and on wall surfaces of sea banks, and more specifically, to a life ladder also serving as a fender for preventing boats from being damaged when the boats come in contact with the quay.

Recently, many wall surfaces of quays of harbors or sea banks of coasts or rivers have an upright construction and one disadvantage of such constructions is that if a person should fall into the water by accident, he would not be able to climb along the wall surface to escape from the water. It is therefore necessary to arrange a number of ladders at suitable intervals along the wall surfaces as described above.

Such ladders are widely employed and are made of metal materials such as iron and stainless steel, are applied with rubber lining to a part of such metal ladders for rust-proofing, or are made of a rust-resisting hard synthetic resin material.

However, where these life ladders are installed on the wall surfaces of quays at and from which boats arrive and depart, sometimes the boat hulls come into contact with the ladders and damage the ladders. Further, when a small boat comes along side the quay which is high in height from the water level to the upper surface of the quay, these ladders are used to transport people up and down between the boat and the quay. In this case, the ladders are sometimes broken due to shocks produced when the boat comes into contact with the bank or due to the up and down movement of the boat during mooring.

2. Description of Prior Art

In view of the foregoing, an attempt has been made to construct a life ladder which also functions as a fender so that the kinetic energy which exists when the boat comes into contact with the bank is absorbed by said life ladder. Such a fender and life ladder combination is proposed, for example, in Japanese Patent Laid-open No. 55-19383, the arrangement of which is explained by reference to FIG. 6. This fender and life ladder combination comprises a pair of hollow square posts 11 and 12 made of rubber vertically mounted on the wall surface of quays or the like and a plurality of rubber step members 13 extending between opposed surfaces of said posts 11 and 12. The rubber posts 11 and 12 accommodate therein metal chains 14 and the rubber step members 13 also accommodate therein metal chains 15. The metal chain 15 has both ends connected to the metal chain 14. However, the aforesaid fender and life ladder is wholly larger in size than prior art iron ladders, and requires extremely complicated steps in molding and processing, such as the step of molding of the rubber posts 11, 12, the time-consuming step of forming the rubber step members 13 integral with said posts, and the time-consuming step of accommodating the chains 14, 15 in said posts 11, 12 and said step members 13. In addition, it requires a large and complicated molding device to manufacture ladders, and therefore, the price required per ladder inevitably becomes high.

On the other hand, the distance which an operator who has fallen into the sea while fully clothed may swim is usually said to be about 30 meters during a severe cold season, and in order to achieve a saving function under such a limit condition, it is desirable to install life ladders on the wall surfaces of quays or the like at intervals as short as possible. However, since prior art rubber ladders are high in unit price, as a practical matter the optimum condition of installation is not fulfilled.

One example of a fender which protects the hull from shocks when the boat comes into contact with the bank is shown in British Pat. No. 945,456, for example, which discloses a fender composed of a rubber cylindrical body whose cross section is trapezoidal, which comprises an abutment portion in abutment with the wall surface of the quay or the like, a buffer portion arranged in position opposed to said abutment surface and with which the hull or the like directly contacts, and two side wall portions which are equal in length to each other for connecting the ends of said abutment portion and buffer portion. Also, U.S. Pat. No. 4,267,792 discloses an elongated fender integrally formed of a resilient material and having an inverted Y-shaped cross section, comprising a shock receiving portion having a substantially rectangular cross section having one flat shock receiving surface with which the hull directly contacts, a pair of side walls with open legs which extend symmetrically to the left and right in directions opposed to each other from said shock receiving portion, and a pair of mounting portions extending horizontally and outwardly from the respective lower ends of said side wall portions. These fenders have great compression deformation and buckling deformation, are excellent in shock absorbing characteristics and are simple in construction, and therefore have a tendency for wise use.

Therefore, the present invention comprises an improvement upon these conventional fenders and provides a fender and life ladder using the general principles of these conventional fenders.

SUMMARY OF THE INVENTION

It is an object of the present invention to provide a life ladder also having a function as a fender which is simple in construction and inexpensive to manufacture.

In accordance with the present invention, there is provided a fender and life ladder combination which comprises a hollow main post mounted substantially vertically on a wall surface of a quay or the like and formed of a resilient material of rubber or synthetic resin having a substantially trapezoidal cross section, said main post comprising a shock receiving portion provided with a shock receiving surface to make contact with a boat, a rear wall portion positioned substantially parallel to and spaced apart from said shock receiving portion, and a pair of side wall portions each being connected along both widthwise ends thereof at approximate right angles with respect to and lengthwise along said shock receiving portion and said rear wall portion, and the pair of side wall portions diverging in directions away from each other from said shock receiving portion towards said rear wall portion, and a plurality of rung members projected substantially horizontally and parallel to the wall surface in a suitably spaced relation along the length of said shock receiving portion, each of said rung members having a part thereof supported on said shock receiving portion.

In accordance with a preferred embodiment of the present invention, the main post is formed of natural rubber, styrene butadiene copolymer rubber, polybutadiene rubber, and other synthetic rubbers. This main post has its cross section of substantially inverted V-shape formed between the shock receiving portion and the side wall portion. The rung member is formed of a hard material such as steel iron, cast iron or engineering plastic, etc., said rung member having a surface coated with a resilient material such as rubber or synthetic resin to prevent the board side from being damaged if it should come into contact with said board side. A reinforcing material such as iron sheet is embedded over the full length of the main post in the rear wall portion of said main post.

Since the fender and life ladder combination of the present invention is provided with the rung members in suitably spaced relation on the main post, it can serve as the life ladder for a person who has fallen into the water, and if the boat should come into collision with said ladder, the kinetic energy of the boat is absorbed by compression deformation of mainly the shock receiving portion and the left and right side wall portions and resultant buckling deformation of said side wall portion, and therefore, it is possible to effectively prevent damage to the board side of the boat as well as to the main post itself.

In the present invention, in order to further enhance said energy absorbing ability of the main post and to facilitate mounting of the rung members and to avoid direct contact between said rung member and the board side of the boat, the shock receiving portion can be increased in wall thickness so that the cross sectional configuration thereof assumes a rectangle, in which case the cross sectional configuration of the main post assumes a substantially inverted Y shape.

DESCRIPTION OF THE PREFERRED EMBODIMENTS

Figure 1:
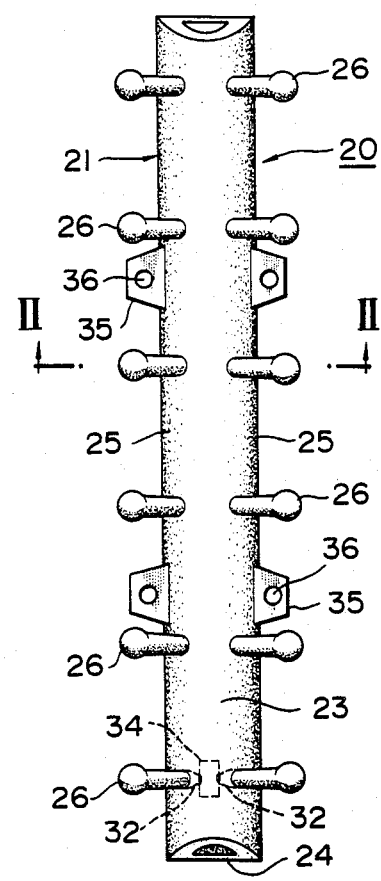
FIG. 1 is a plan view of a fender and life ladder combination in accordance with a first embodiment of the present invention.
Figure 2:
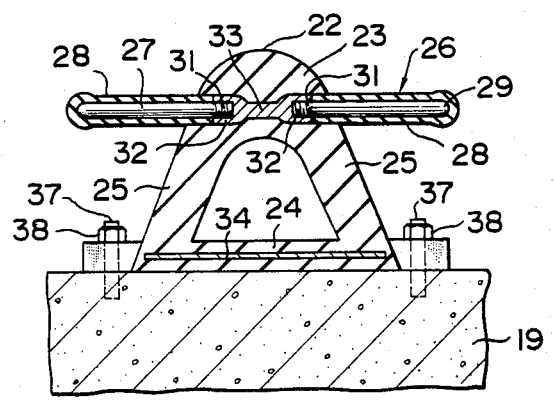
FIG. 2 is a cross sectional view of the fender and life ladder combination on an enlarged scale taken along line II—II of FIG. 1.

Referring to a first embodiment of the present invention shown in FIGS. 1 and 2, a fender and life ladder combination mounted substantially vertically on the wall surface of a quay 19 or the like is generally indicated at reference numeral 20. This life ladder 20 has a hollow main post 21 formed of a resilient material such as natural rubber, styrene butadiene copolymer rubber, polybutadiene and other synthetic resins such as synthetic rubber. This main post 21 comprises a shock receiving portion 23 having an arch-like shock receiving surface 22 with which the hull of a boat may come into direct contact, a flat rear wall portion 24 substantially parallel to and spaced apart from and opposed to said shock receiving portion 23, and a pair of side wall portions 25, each side wall portion 25 being connected along both widthwise ends at thereof approximate right angles with respect to and lengthwise along said shock receiving portion and said rear wall portion 24, the portions 23, 24 and 25 being integrally molded. The pair of side wall portions 25 diverge in directions away from each other from said shock receiving portion towards said rear wall portion. Thus, the rear wall portion 24 has its width greater than that of the shock receiving portion 23. A plurality of rung members 26 are mounted substantially horizontally in a suitably spaced relation on the shock receiving portion 23. Each rung member 26 comprises a rod 27 formed of steel, iron, cast iron, engineering plastics, etc. and a resilient material 28 such as rubber to coat said rod 27 which has one end formed with a spherical projection 29 to prevent lateral slip of the hands or feet. Each rod 27 has the other end formed with threads 31 which are threadedly engaged with a socket member 32 embedded into the shock receiving portion 23. The socket member 32 is mounted on a rectangular iron plate 33 embedded into the shock receiving portion 23. A reinforcing plate 34 formed from strip-like iron is embedded into the rear wall portion 24. Monting flanges 35 are integrally formed on the widthwise ends of the rear wall portion 24 in a suitably spaced relation. Anchor bolts 37 projected from the wall surface of the quay 19 or the like are inserted into bolt holes 36 of the mounting flanges 35 and then fixed by nuts 38 so that the main post 21 may be secured to the wall surface of the quay 19 or the like.

In the fender and life ladder combination of the present invention, the rung members 26 are mounted on the main post 21 which performs a function as a fender in a suitably spaced relation, and therefore, it may be used as the life ladder for a person who has fallen into the water and can effectively prevent damage of the main post itself as well as damage on the board side of a boat by the absorbing ability of kinetic energy resulting from compression and buckling deformation of the main post 21. In addition, the reinforcing plate 34 formed of iron or the like extends over the overall length of the rear wall portion 24 and is embedded into the rear wall portion 24 of the main post 21, and thus, the fender and life ladder processes sufficient strength. While the rung members 26 comprise a pair of left and right rung members which constitute one step, it should be noted that a central portion of a single rung member can be supported by the shock receiving portion 23.

Figure 3:
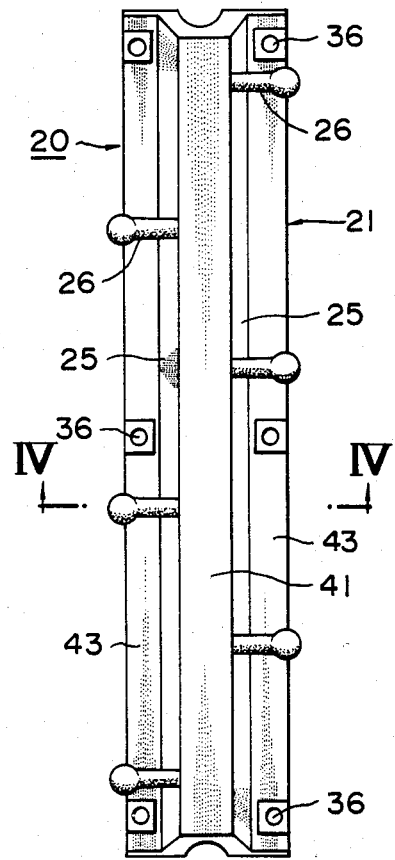
FIG. 3 is a plan view of a fender and life ladder combination in accordance with a second embodiment of the present invention.
Figure 4:
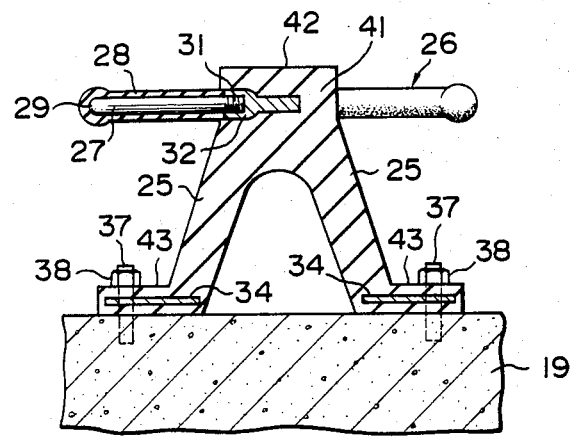
FIG. 4 is a cross sectional view of the fender and life ladder combination on an enlarged scale taken along line IV—IV of FIG. 3.

FIGS. 3 and 4 show a second embodiment of the present invention, in which the same elements as those shown in the first embodiment are indicated by the same reference numerals and the detailed description thereof are omitted. In this second embodiment, the shock receiving portion 41 of the main post 21 has a flat shock receiving surface 42 and is substantially rectangle in cross section. The rear wall portions 43 are extended parallel to the shock receiving portion and opposed to each other from one end of each side wall portion 25, bolt holes 36 are provided in the rear wall portion 43 in a suitably spaced relation, and the ladder is secured to the wall surface of the quay 19 or the like by the rear wall portion 43. In this embodiment, the rung members 26 are mounted alternately in a suitably spaced relation with the shock receiving portion 41 placed therebetween. Accordingly, one socket 32 is provided on the iron plate 33. It will be noted that in the rear wall portion 43, left and right rear wall portions can be formed integrally so as to block the surface opposed to the shock receiving portion 41 in a manner similar to that of the aforementioned first embodiment.

In the case of the fender and life ladder combination in this second embodiment, the shock receiving portion 41 of the main post 21 has a greater wall thickness than that of the first embodiment, and therefore, even if the side wall portion 25 is subjected to buckling deformation outwardly due to contact with the hull, the hull does not come into contact with the side wall portions 25 due to the presence of the shock receiving portion 41, as a consequence of which the side wall portion may obtain a greater amount of buckling deformation. Furthermore, since the shock receiving portion 41 has a great wall thickness, the iron plate 33 having the socket 32 for threadedly fixing the rung members 26 may be easily embedded, and in addition, the rung members 26 may be disposed at the rear of the shock receiving portion as as to prevent the rung members 26 from coming into contact with the board side.

Figure 5:
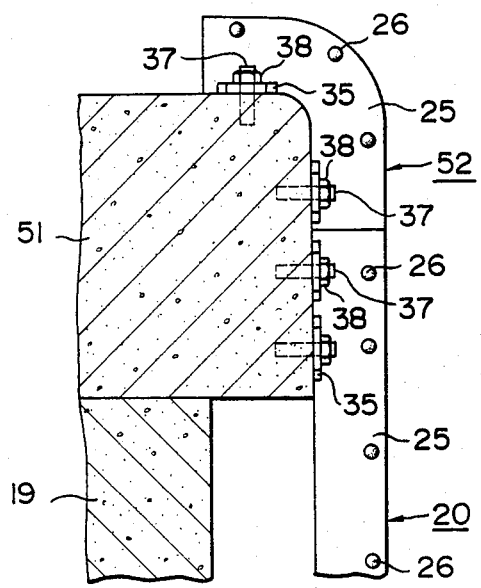
FIG. 5 is a partially cutaway side view showing one example in which the fender and life ladder combination of the present invention is mounted on the wall surface of a quay.
Figure 6:
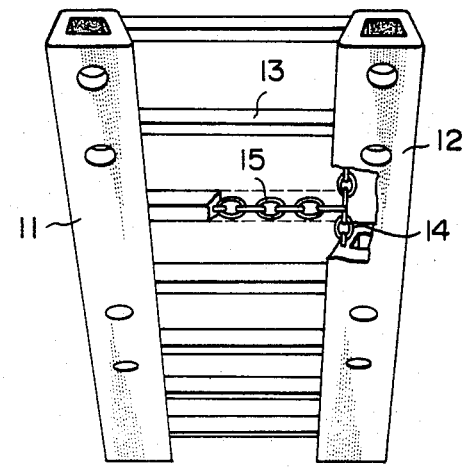
FIG. 6 is a perspective view showing one example of a conventional fender and life ladder combination, one portion thereof being partly cutaway.

FIG. 5 shows an embodiment in which the fender and life ladder combination of the present invention is mounted on the quay formed with an upper plate such as concrete so as to be projected from the wall surface of the quay 19 on said quay 19. In the fender and life ladder, the life ladder 20 of the aforementioned first embodiment is fixed with the upper end thereof positioned substantially in the middle of the side of an upper plate 51, and one end of a life ladder 52 designed for corners is connected to said upper end. This corner life ladder 52 has a structure similar to that of the aforementioned first embodiment but a side configuration thereof is in the form of a substantially L-like bend. In the case of this embodiment, the fender and life ladder combination is mounted in a cantilever fashion but as described hereinbefore, the reinforcing iron plate is embedded into the rear wall portion of the post of the life ladder 20 to increase the strength of the life ladder 20, and therefore, when a person who has fallen into the water climbs along the ladder, no inconvenience such as rolling occurs. While in this embodiment, the corner life ladder is separately provided, it should be of course understood that the corner portion can be formed integrally with the straight portion 20.

What is claimed is:

1. A fender and life ladder combination comprising: a hollow main post mountable substantially vertically on a wall surface of a quay or the like during use and formed of a resilient material of rubber or synthetic resin having a substantially trapezoidal cross section, said main post comprising a shock receiving portion provided with a shock receiving surface for making contact with a boat, a rear wall portion positioned substantially parallel to and spaced apart from said shock receiving portion, and a pair of side wall portions each connected along both widthwise ends thereof to respective ones of said shock receiving portion and said rear wall portion, the pair of side wall portions diverging away from each other in the direction from said shock receiving portion towards said rear wall portion; and a plurality of rung members extending substantially horizontally and parallel to the wall surface in a suitably spaced relation along the length of said shock receiving portion, each of said rung members having a part thereof supported on said shock receiving portion.

2. A fender and life ladder combination according to claim 1, wherein a plurality of mounting flanges for mounting said main post on the wall surface are provided in a suitably spaced relation on both widthwise ends of said rear wall portion.

3. A fender and life ladder combination according to claim 1, wherein said shock receiving portion and said pair of side wall portions have a configuration which is generally V-shape in cross section and said shock receiving portion has an arch-like configuration.

4. A fender and life ladder combination according to claim 1, wherein said shock receiving portion and said pair of side wall portions have a configuration which is generally Y-shape in cross section, and said shock receiving portion is substantially rectangular in cross section.

5. A fender and life ladder combination according to claim 1, wherein each of said rung members comprises a rod member, and a coating of a resilient material coating the surface of said rod member.

6. A fender and life ladder combination according to claim 1, wherein each of said rung members is detachably mounted on a socket member provided within said shock receiving portion.

7. A fender and life ladder combination according to claim 1, wherein a plate-like reinforcing material is embedded within said rear wall portion over the overall length thereof.

8. A fender and life ladder combination comprising: an elongate main post mountable substantially vertically on a wall surface of a quay or the like during use of the fender and life ladder combination, the main post being composed of resilient material and having a shock-receiving front wall portion, a pair of resiliently flexible side wall portions connected to respective sides of the shock-receiving front wall portion and extending rearwardly thereof in diverging relation with respect to each other, and a rear wall portion connected to the divergent ends of the side wall portions and having a substantially flat rearmost surface for abutment against the wall surface of a quay or the like during use; and a plurality of rung members embedded in and attached to the shock-receiving front wall portion in spaced relation therealong, the rung members extending laterally of the main post and being spaced apart a distance sufficient to enable the rung members to be used as a ladder.

9. A fender and life ladder combination according to claim 8; wherein the rear wall portion interconnects the divergent ends of the two side wall portions.

10. A fender and life ladder combination according to claim 9; wherein the rear wall portion has a reinforcing member embedded therein along substantially the entire length thereof.

11. A fender and life ladder combination according to claim 9; wherein the shock-receiving front wall portion and the pair of side wall portions have a generally V-shaped cross section.

12. A fender and life ladder combination according to claim 8; wherein the shock-receiving front wall portion and the pair of side wall portions have a generally V-shaped cross section.

13. A fender and life ladder combination according to claim 8; including a plurality of socket members completely embedded within the shock-receiving front wall portion in spaced relation therealong, each socket member having at least one internally threaded bore; and wherein said rung members comprise externally threaded rods threadedly engaged in respective ones of the threaded bores.

14. A fender and life ladder combination according to claim 13; wherein each socket member has two internally threaded bores.

15. A fender and life ladder combination according to claim 13; wherein the rods have a coating of resilient material.

16. A fender and life ladder combination according to claim 8; wherein the shock-receiving front wall portion has an outwardly curved frontmost surface.

17. A fender and life ladder combination according to claim 8; wherein the rear wall portion comprises a pair of rear wall parts connected to respective ones of the divergent ends of the two side wall portions and extending outwardly therefrom in opposite directions.

18. A fender and life ladder combination according to claim 17; wherein each rear wall part has a reinforcing member embedded therein along substantially the entire length thereof.

19. A fender and life ladder combination according to claim 17; wherein the shock-receiving front wall portion and the pair of side wall portions have a generally Y-shaped cross section.

20. A fender and life ladder combination according to claim 8; wherein the shock-receiving front wall portion and the pair of side wall portions have a generally Y-shaped cross section.

* * * * *